United States Patent
Martin-Cocher et al.

(10) Patent No.: US 6,170,776 B1
(45) Date of Patent: *Jan. 9, 2001

(54) OUTER WRAPPING FILM, A DEVICE FOR PRIOR STRETCHING OF THE FILM, AND AN OUTER WRAPPING METHOD

(75) Inventors: Jean-Paul Martin-Cocher, la Motte-Servolex; Georges Jaconelli, Brison Saint-Innocent, both of (FR)

(73) Assignee: Thimon, S.A. (FR)

( * ) Notice: Under 35 U.S.C. 154(b), the term of this patent shall be extended for 0 days.

This patent is subject to a terminal disclaimer.

(21) Appl. No.: 09/359,668

(22) Filed: Jul. 23, 1999

Related U.S. Application Data

(62) Division of application No. 08/851,755, filed on May 6, 1997.

(30) Foreign Application Priority Data

May 6, 1996 (FR) .................................................. 96 05645
Jun. 20, 1996 (FR) .................................................. 96 07708

(51) Int. Cl.⁷ ............................ B65H 23/00; B65B 53/00
(52) U.S. Cl. ................................. 242/410; 425/66; 53/441
(58) Field of Search ....................... 53/441, 556; 425/66; 242/160.1, 160.4, 419.5, 613.1, 918, 410; 428/98, 217, 218, 219, 221, 332

(56) References Cited

U.S. PATENT DOCUMENTS

| | | |
|---|---|---|
| 4,102,513 | 7/1978 | Guard . |
| 4,503,658 | 3/1985 | Mouser et al. . |
| 5,248,547 | 9/1993 | Wilson . |
| 5,797,240 * | 8/1998 | Martin-Cocher et al. ......... 53/441 X |

FOREIGN PATENT DOCUMENTS

| | | |
|---|---|---|
| 2 724 100 | 12/1977 | (DE) . |
| 0 086 888 | 8/1983 | (EP) . |
| 0 246 659 | 11/1987 | (EP) . |
| 0 466 980 | 1/1992 | (EP) . |
| 0 531 021 | 3/1993 | (EP) . |
| 74 27653 | 10/1974 | (FR) . |
| 2 055 345 | 3/1981 | (GB) . |
| 2 083 002 | 3/1982 | (GB) . |
| 2 115 783 | 9/1983 | (GB) . |
| WO 89/06594 | 7/1989 | (WO) . |
| WO 94/04419 | 3/1994 | (WO) . |

* cited by examiner

Primary Examiner—Donald P. Walsh
Assistant Examiner—William A. Rivera
(74) Attorney, Agent, or Firm—Schwartz & Weinrieb

(57) ABSTRACT

A wrapping method comprises the prior stretching of a film. The prior Stretching of the film advantageously includes a step of paying out the film from a feed reel, a stretching step, and a step of winding the stretched film onto a mandrel or a take-up reel in readiness for subsequent use. The film of the present invention is previously stretched under a large amount of tension, is released, and is then wound under moderate tension, under which the film is allowed to relax. The present invention is applicable to preparing film for wrapping loads that are optionally palletized and suitable for being put into place either manually, or mechanically.

18 Claims, 4 Drawing Sheets

OUTER WRAPPING FILM, A DEVICE FOR PRIOR STRETCHING OF THE FILM, AND AN OUTER WRAPPING METHOD

This patent application is a Divisional patent application of prior U.S. patent application Ser. No. 08/851,755, which was filed on May 6, 1997.

FIELD OF THE INVENTION

The present invention relates generally to an outer wrapping film, to a device for prior stretching of the film and suitable for use in prior stretching such an outer wrapping film, and to a method of outer wrapping that uses such a film. The prior stretching advantageously includes a step of paying out the film from a feed reel, a stretching step, and a step of winding the stretched film onto a mandrel or a take-up reel, prior to subsequent use.

BACKGROUND OF THE INVENTION

A helical wrapping technique that is conventionally used only by simple machines operating at a low rate of throughput, stretches a film directly on a palletized load in the form of a rectangular parallelepiped. The film is taken from a vertical axis reel fitted with a brake. One end of the film is initially fixed to the load, after which the load is caused to rotate about a vertical axis. The reel is braked in such a manner as to cause the film to be stretched by the desired amount.

Unfortunately, since the load is not circularly cylindrical, but generally forms a rectangular parallelepiped, the radial distance to be covered with the film varies with respect to the particular portion or region of the load being wrapped, so that rotating the load at a constant angular velocity while applying a constant braking force causes the film to be elongated in a non-uniform manner. Also, immediately after stretching, the stretchable film is subject to relaxation which leads, over a period of approximately 48 hours, to a drop in its resilient return force that is substantially equal to 50%. Thus, with a machine of this type, there is a limit set by the stretching forces that can be withstood by the load, whereas the resilient forces that subsequently provide cohesion to the load during handling and transport are significantly lower. These factors have led to the above type of machine being abandoned in favor of wrapping machines including a pre-stretching device comprising a plurality of motor-driven rollers operating at different peripheral speeds. At the outlet from the rollers of the pre-stretching device, the film is wrapped without tension, or preferably under low tension, on the load to be wrapped, as explained with reference to FIG. 1.

In patent application No. 92/10254 (published under No. FR 2 695 102), the Applicant describes a method of wrapping a load in a previously-stretched film, with the film being put into place only after a period has elapsed to allow the film to relax while still under tension. As explained below with reference to FIG. 2, that patent application indicates that it is thus possible to achieve an improvement with respect to residual elongation, after the film has relaxed, thereby making it possible to consume less film.

In patent application No. 92/10254 (published under No. FR 2 695 102), the Applicant describes the optimum way of using a previously-stretched film with relaxation under a high level of tension.

However, films relaxed under a high level of tension are not suitable for all types of wrapping. Firstly, they exert a large constriction force on the film reel, which force can, in some cases, be great enough to destroy such a reel. It is thus necessary to use reels that are very strong in compression, for example, those made of steel. Such reels are expensive and, in most cases, must be reused. The return of empty reels gives rise to non-negligible costs. Also, because of its elastic memory, the film placed around a load exerts a constriction force which has a value that is substantially equal to half the value of the tension under which the film was relaxed. Thus, some loads are too fragile or too compressible to withstand the constriction forces exerted by a film that has been relaxed under a high level of tension. Further, films relaxed under a high level of tension are rather stiff, are not very resilient, and they are often fragile. In some cases, such films present a high risk of being punctured, in particular at the corners of the pallet.

WO 89/06594 describes a device for producing thin films that takes best advantage of the production capacities of an extruder. A relatively thick film is initially extruded and its area can be increased by stretching.

In that document, it is desired to release the force in the film as much as possible prior to relaxation in order to wind the film around a load with a force that is as low as possible.

OBJECTS OF THE INVENTION

Consequently, an object of the present invention is to provide an outer wrapping film that exerts a controlled constriction force on its storage reel.

Another object of the present invention is to provide an outer wrapping film which has suitable for exerting a moderate force on the wrapped load.

It is also an object of the present invention to provide an outer wrapping film which has good mechanical properties, in particular a film that is resilient, and that withstands friction and puncturing.

It is also an object of the present invention to provide an outer wrapping film which has suitable for being deposited around a load with a tension which is lower than the tension that it subsequently exerts on the load in order to ensure cohesion thereof.

It is also an object of the present invention to provide a film which is able to be adapted to the mechanical characteristics of the goods forming the load to be wrapped.

SUMMARY OF THE INVENTION

The foregoing and other objects are achieved by a film of the present invention which has been previously stretched under large tension, released, and then wound upon a reel under moderate tension under which the film is relaxed.

In accordance with a first variant implementation of the method of the present invention for preparing the film, tension in the film is released immediately after the stretching step. As soon as it reaches the desired elongation, the released film is wound under moderate tension on a storage reel on which it subsequently relaxes. In accordance with a second implementation of the method of the present invention for preparing the film, the film is maintained under tension for a short period of time before the tension in the film is released and it is wound onto a reel. For example, a film that has been stretched and that is being maintained under tension is caused to follow a path between deflection rollers so as to release the film somewhat later after it has been stretched. Depending on the constriction force exerted, the film is wound onto a mandrel made of cardboard, of plastic material, of steel, or of some other material.

The invention mainly provides a wrapping film that is subjected to stretching, under a tension lying in the range of 10 N/mm² to 20 N/mm², of its initial cross-section, to winding, and to relaxation on a take-up mandrel or reel under tension lying in the range of 10% to 90% of the stretching tension.

The invention also provides a film subjected to winding and relaxation under tension lying in the range of 10% to 50% of the stretching tension.

The invention also provides a film, wherein, after the stretching operation and before release, it has been subjected to partial relaxation at the stretching tension for a period of time lying in the range of 0.1 s to 10 s.

The invention also provides a reel of film, comprising a film of the invention wound onto a cardboard hub.

The invention also provides a reel of film comprising a plastic material film of the invention wound on a hub.

The invention also provides a film stretching machine including means for stretching a stretchable film, guide means for guiding the film, and winding means for winding the stretched film on a storage reel, the machine including means for partially releasing the tension in the film after stretching and before winding onto the storage reel.

The invention also provides a machine, wherein the stretching means and the means for partially releasing the tension comprise motor-driven rollers, and wherein the different peripheral speeds of the outlet rollers of the stretching means compared with the speed of the roller of the means for partially releasing the tension in the film lies in the range of 10 to 90%, and preferably in the range of 10% to 50%.

The invention also provides a machine, wherein the stretching means and the means for partially releasing the tension comprise motor-driven rollers, and wherein the different peripheral speeds of the outlet rollers of the stretching means compared with the speed of the roller of the means for partially releasing the tension in the film lies in the range of 10% to 50%, and preferably in the range of 10% to 30%.

The invention also provides a machine, including means for varying the ratio of the peripheral speeds of the outlet rollers of the stretching means compared with the speed of the roller of the means for partially releasing the tension in the film.

The invention also provides an outer wrapping method including a step of depositing a film of the invention around a load, in particular a palletized load.

The invention also provides a method, wherein the film is deposited on the load under a tension that is less than half the stretching tension of the film.

BRIEF DESCRIPTION OF THE DRAWINGS

The invention will be better understood from the following description and the accompanying drawings, given as non-limiting examples, in which like reference characters designate like or corresponding parts throughout the several views, and wherein.

DETAILED DESCRIPTION OF THE ILLUSTRATED EMBODIMENTS

In the non-limiting examples of FIGS. 1 to 6, there can be seen the behavior of a film having a thickness of 20 μm, and a strip width of 0.5 m, the film being of linear low density polyethylene manufactured using a flat or a tubular die.

Figure 7:
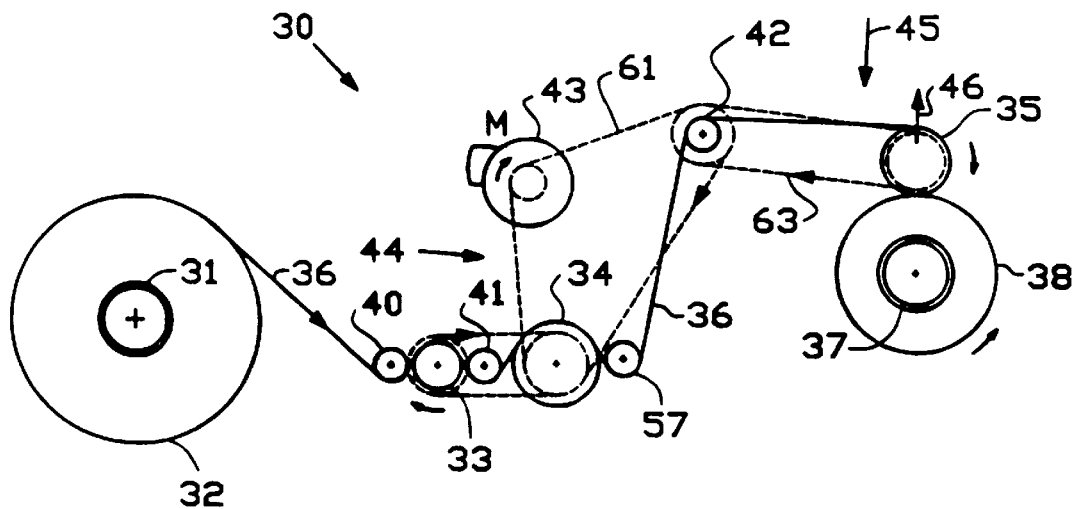
FIG. 7 is a diagrammatic plan view showing the path of the film in a first embodiment of a pre-stretching machine of the present invention.
Figure 8:
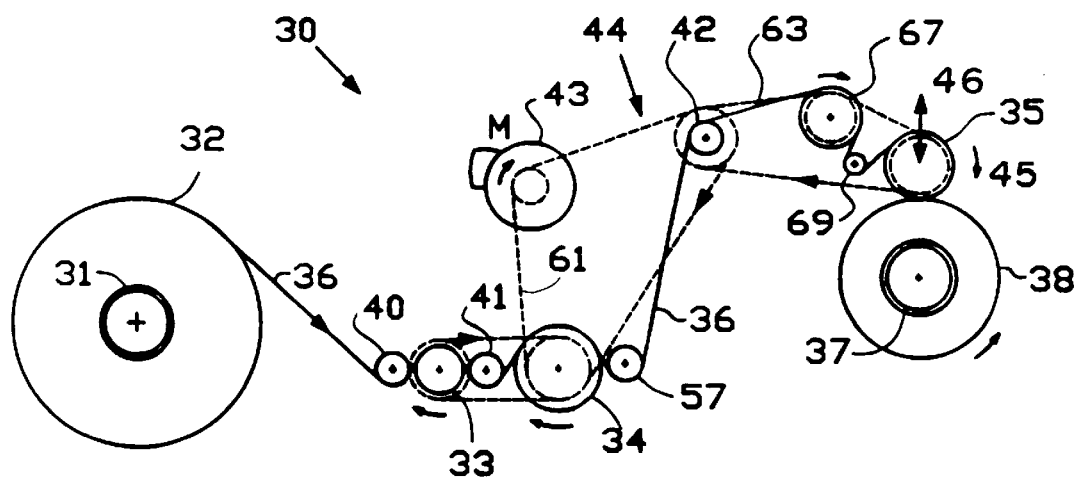
FIG. 8 is a diagrammatic plan view showing the path of the film in a second embodiment of a pre-stretching machine of the present invention.

In FIGS. 7 and 8, the same reference characters are used to designate the same elements.

Corresponding zones of the curves in FIGS. 1 to 6 are designated by the same reference characters followed by a dot and the number of the figure.

Figure 1:
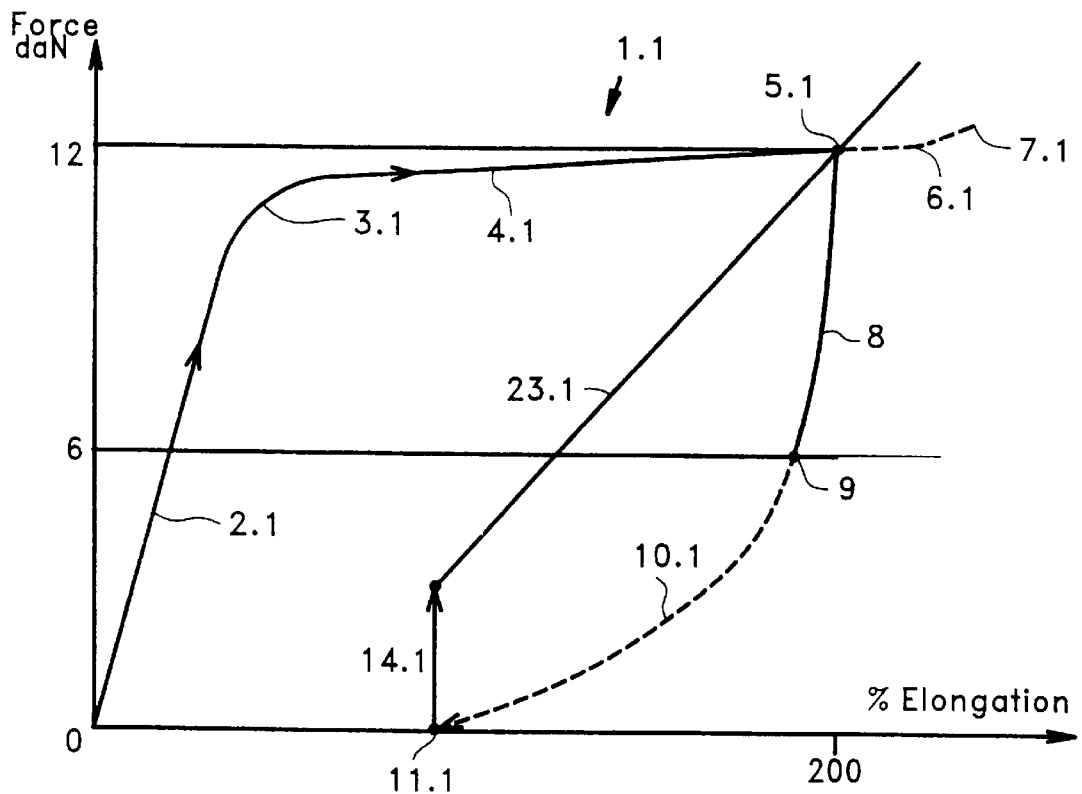
FIG. 1 is a graph explaining the behavior of a film that is stretched while simultaneously being deposited on a load (PRIOR ART)

FIG. 1 shows how curve 1.1 varies over time, wherein the curve plots the return force expressed in daN exerted by a stretchable polyethylene film as a function of its elongation expressed in % during a known type of pre-stretching that occurs substantially simultaneously with being wrapped on a load. Zero elongation corresponds to the film before stretching, whereas 100% elongation corresponds to the length of the film being doubled. The film is prevented from tearing on sharp edges of the load and from crushing the load around which it is wrapped by as a result of the film being released during wrapping, but this decreases its elongation and thus increases the rate at which film is consumed. In a conventional wrapping machine fitted with motor-driven pre-stretching means in which the deposition force is controlled, the tension in the film at the outlet from the pre-stretching rollers is preferably reduced by substantially 50%, with this reduced tension being applied immediately to the load during wrapping. Practically all of the relaxation that takes place in films wrapped around a load under low tension is equivalent to the residual tension after relaxation. This tension after release and relaxation corresponds substantially to half the tension necessary for obtaining optimum elongation. In the example shown in FIG. 1, simplified curve 1.1 begins with a substantially linear zone 2.1 followed by a rounded zone 3.1 corresponding to a plastic yield threshold, followed by an approach to a horizontal line in zone 4.1 corresponding, for example, to elongation in the range of 100% to 200%, and to a traction force of 12 daN. The traction force is stopped at point 5.1 corresponding to a force of 12 daN and to an elongation of 200%. Additional elongation shown at 6.1 would lead to rupture at point 7.1 corresponding substantially to elongation of 500% and to a force of 15 daN to 20 daN. With improved conventional machines, the film is released at 8 and returns elastically in a manner that corresponds to reducing tension and elongation until point 9 is reached which corresponds substantially to a force of 6 daN and to an elongation of 170%. The pre-stretched film is paid out at a speed that is slightly greater than the wrapping speed and relaxation takes place under this tension reduced to half, mainly in the portion of the film which is situated between the pre-stretching device and the load. This reduced return force corresponds to the residual return force in the film after relaxation. This avoids subjecting the load that is to be wrapped to a traction force greater than that which actually provides its cohesion during subsequent handling.

10.1 shows in dashed lines the relaxation that would take place in the film if the tension were to be released completely. Under such circumstances, the resulting residual elongation at 11.1 would be substantially equal to 120%, that is, the length of the film would have been increased by multiplying by a factor of 2.2. The tension in the film deposited around the load rises at 14.1 to a value which is substantially equal to 3 daN.

Figure 2:
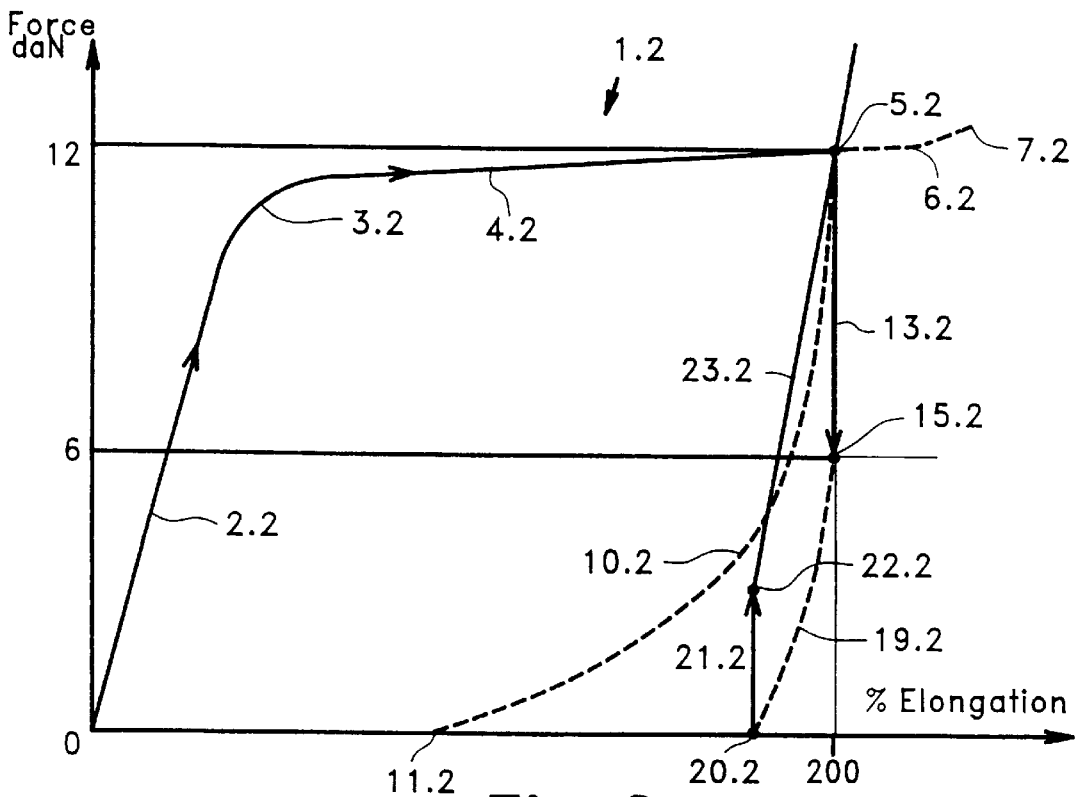
FIG. 2 is a graph explaining the behavior of a film that is stretched and allowed to relax under a large amount of tension (PRIOR ART)

Curve 1.2 in FIG. 2 corresponding to pre-stretching with relaxation under a high level of tension on the reel, has zones 2.2, 3.2, and 4.2, and a point 5.2 which are respectively equivalent to the zones 2.1, 3.1, and 4.1, and to the point 5.1 of FIG. 1. Thereafter, relaxation corresponding to the curve dropping vertically at 13.2 is obtained, for example, by maintaining the pre-stretched film under tension on a mandrel. It is extremely easy to use a common stretchable film of polyethylene insofar as the film is slightly adhesive, thereby avoiding any need to take special precautions during handling. After relaxation along curve line 13.2, the curve reaches graph 15.2 corresponding to a return force of 6 daN, which is half the pre-stretching force that is equal, in the example, to 12 daN for an elongation of 200% greater than the residual elongation obtained at point 9 in FIG. 1 and giving rise to a saving in film as already described in patent application No. 92/10254.

Figure 3:
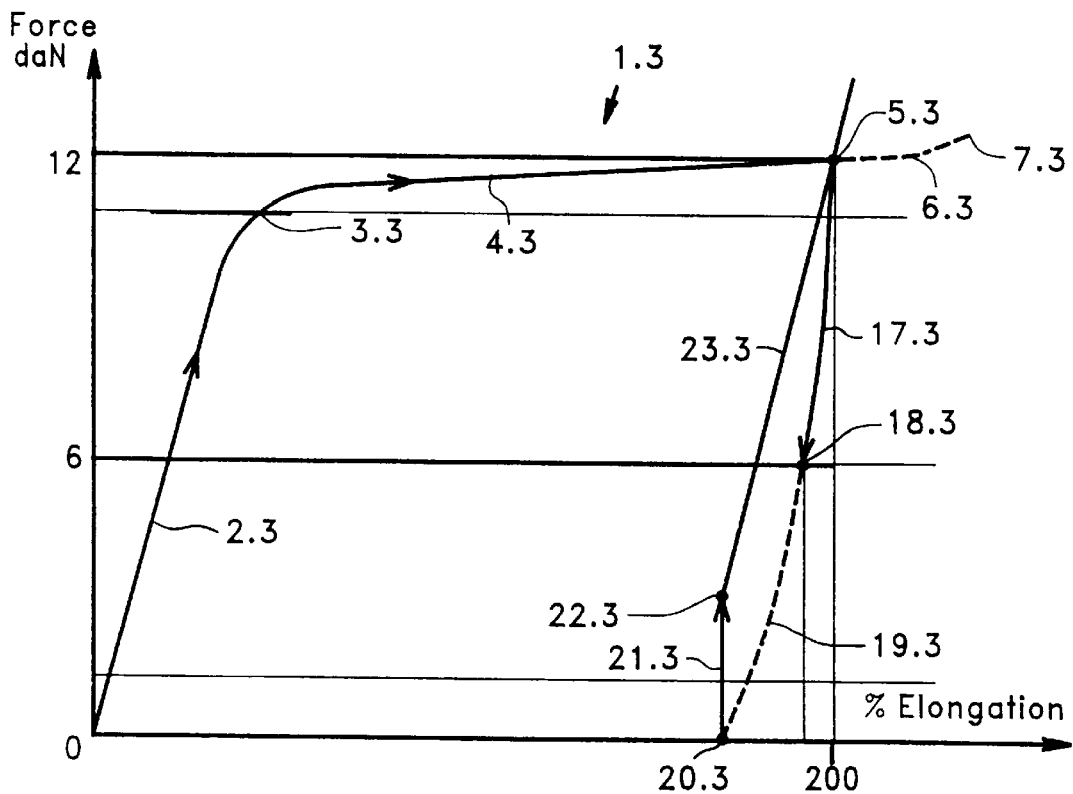
FIG. 3 is a graph explaining the behavior of a film of the invention that has been subjected to stretching under tension, to moderate release of the tension, to winding on a reel, and to relaxing under the moderate tension.

Curve 1.3 in FIG. 3, corresponding to pre-stretching with relaxation under moderate tension on a reel, has zones 2.3, 3.3, and 4.3, and a point 5.3 which are equivalent to the zones 2.1, 3.1, and 4.1, and to the point 5.1 respectively of FIG. 1. Thereafter, along curve line 17.3, the tension is released, advantageously to point 18.3 which corresponds substantially to half the traction force required for providing elongation of the film during stretching (6 daN in the example shown). At 19.3, the dashed line shows the residual elasticity that would occur in the film if the tension were to be released completely on being placed around the load. Under such circumstances, the residual elongation obtained at 20.3 will be substantially equal to 175%. Advantageously, the film is applied to a load, for example, on a pallet, using tension that is less than or equal to the tension to which the film was released (point 18.3) so as to avoid re-stretching. In this embodiment, the film is put into place on the load at very low tension, for example, in the range 0.5 daN to 1 daN. However, it should be understood that placing the film of the present invention on a load to be wrapped while using a greater tension would not go beyond the ambit of the present invention.

For release substantially equal to half the stretching force (tension on the reel equal to half the stretching force), the tension in the film and the elongation of the film do not vary during the relaxation stage, and this is represented in FIG. 3 by the point 18.3. After relaxation for several tens of seconds (given that full relaxation requires several hours), the film of the invention can be used for wrapping a load, and advantageously a palletized load. In the example shown in FIG. 3, outer wrapping is performed at point 20.3 under extremely low tension, after the release of tension has given rise to contraction of the film which loses a fraction of its elongation, as shown by the curve 19.3. In the example shown at point 20.3, at substantially zero tension, the film retains elongation that is substantially equal to 175%. After the film has been wrapped around the pallet, it develops a large cohesion force as shown at 21.3 that, at 22.3 reaches substantially half the tension at which it was wound prior to relaxation (point 18.3) and thus one-fourth of the stretching tension (point 5.3). The substantially straight line 23.3 connecting point 22.3 to point 5.3 corresponds to the reaction curve of the film when subjected to stresses attendant or impressed upon the load during handling or transport. A reaction curve that is nearly vertical reduces undesirable deformation of the wrapped load that is subjected to forces during handling and transport (such as, for example, tilting, braking, acceleration, shocks, and the like).

In most cases, the increase in the constriction force exerted by the film of the present invention after the film has been put into place on a load presents numerous advantages. Firstly, insofar as the load is capable of withstanding such a force, the force provides the load with cohesion while it is being handled and transported. In addition, it makes it possible to increase machine throughput, and to implement the use of wrapping machines of low power, and indeed it makes it easy to place the film on the load by hand. Furthermore, putting the film in place using a force that is low or very low, for example lying in the range 0.1 daN to 2 daN minimizes any risk of breaking the film, particularly on the sharp edges of the load. However, some loads, such as empty plastic bottles, for example, are too fragile, or other loads, such as toilet paper, rolls of hand-wiping paper, and other cellulose-based household goods are too compressible, to withstand a large constriction force without being damaged. Under such circumstances, it is advantageous to use the film whose behavior is shown in FIG. 4 where the film is subjected to relaxation at a tension lower than that of the film whose behavior is shown in FIG. 3.

Figure 4:
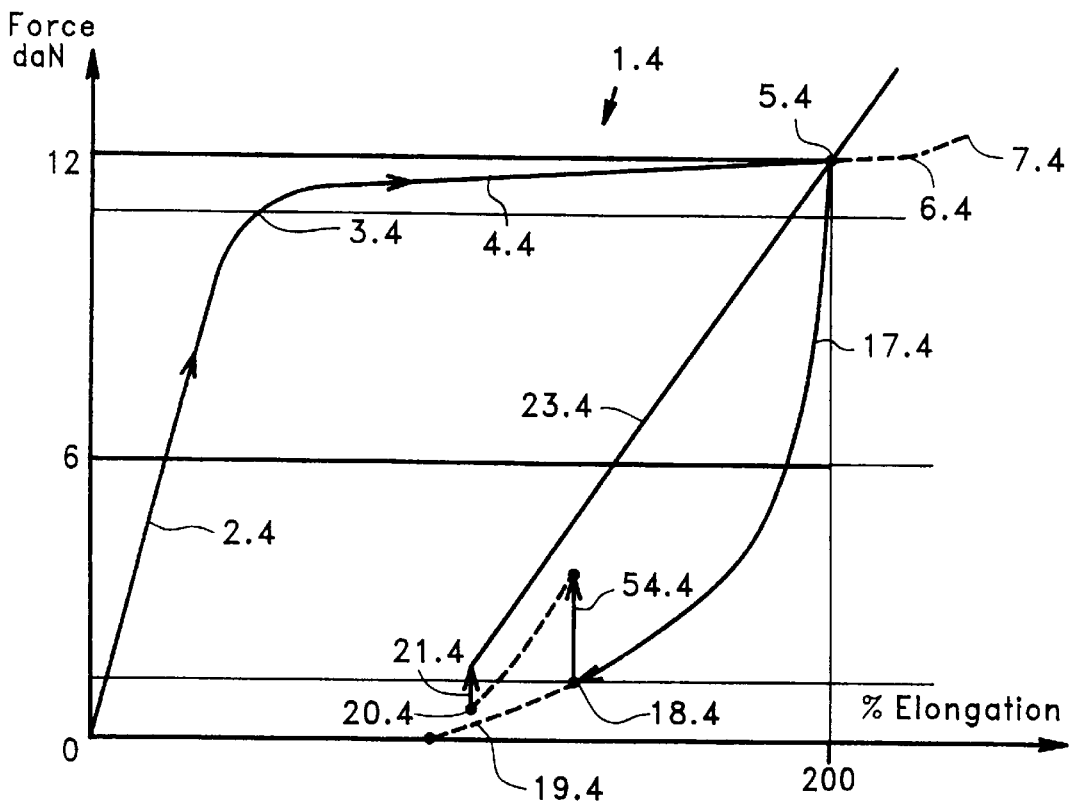
FIG. 4 is a graph explaining the behavior of a film of the invention that has been subjected to stretching under tension, to a release of the tension that is greater than that shown in FIG. 3, and to relaxing, with the force being reapplied, for example, on a reel, but at a tension that is lower than that shown in FIG. 3.

In FIG. 4, there can be seen the behavior of a film of the present invention in which the tension after stretching is released to 1.2 daN at point 18.4. During relaxation, the tension increases to 3.5 daN as seen along line 54.4. After the film has been wrapped around a load at 20.4 under very low tension, the tension exerted by the film on the load increases after being wrapped around the load to a value that is substantially equal to no more than 1.5 daN as illustrated by the point 21.4. The release of tension during wrapping causes the length of the film to shrink so that the residual elongation of the film is equal to 150%. This type of force is compatible with loads that are easy to wrap. In addition, the reaction curve 23.4 has a slope that is shallower than the reaction curve 23.3 of FIG. 3, but greater than that of the reaction curve 23.1 of FIG. 1.

Naturally, the present invention is not limited to releasing the film tension after elongation to a value greater than or equal to half the value of the stretching force.

Figure 5:
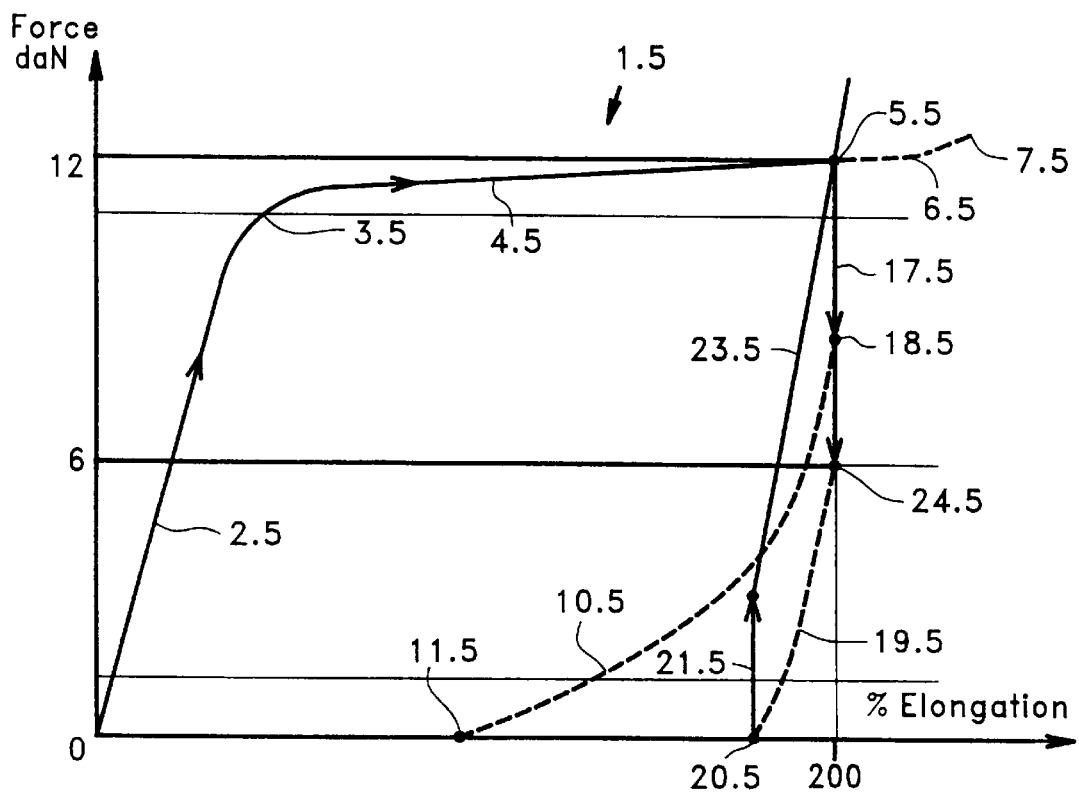
FIG. 5 is a graph explaining the behavior of a film of the invention that has been subjected to stretching under tension, a smaller release of the tension than that shown in FIG. 3, to winding, and to relaxing, with a force being taken up again, under a tension that is greater than that shown in FIG. 3.

In the example shown in FIG. 5, the film is released to a tension that is substantially equal to 8 daN as illustrated at 18.5. During relaxation down to the force level indicated at 24.5, elongation does not change (the film is still wound on a reel) but tension drops. The example of FIG. 5 shows the case that lies between the film of the prior art type as shown in FIG. 2, and the advantageous embodiment shown in FIGS. 3 and 4.

Figure 6:
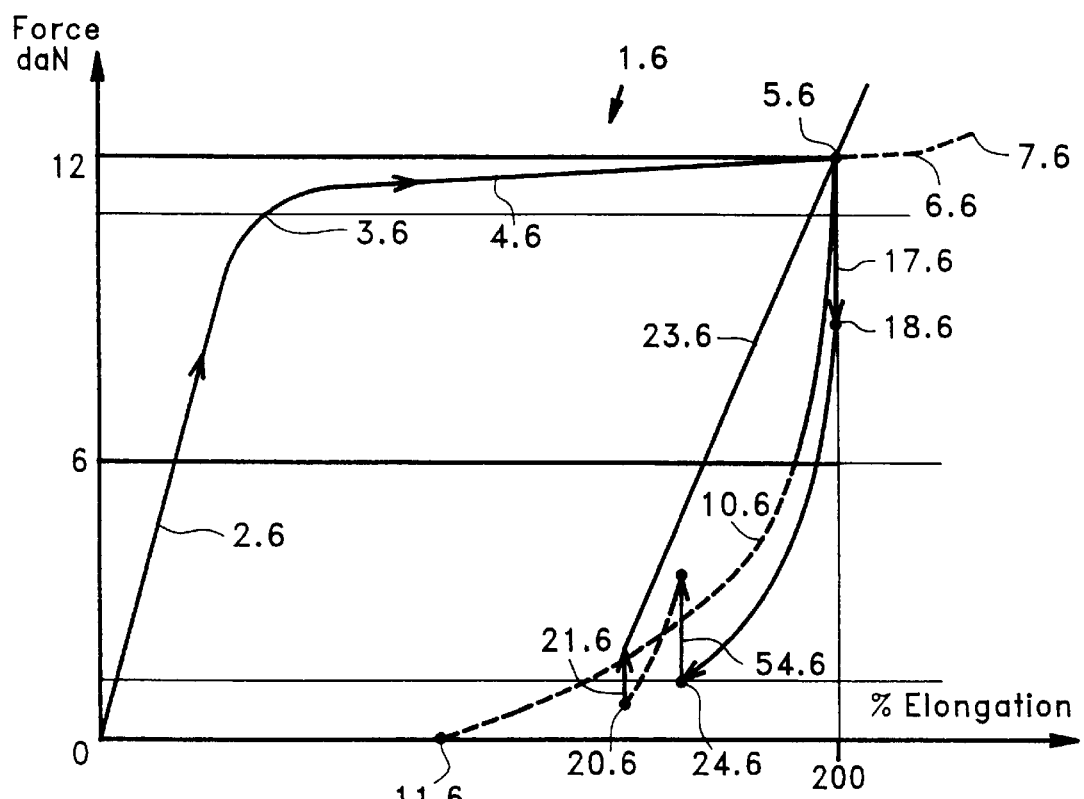
FIG. 6 is a graph explaining the behavior of a film of the present invention that has been subjected to stretching under tension, to partial relaxing under stretching tension, to release of the tension, and to complete or almost complete relaxing, with the force being reapplied, but under a small amount of tension.

FIG. 6 shows the behavior of a film that has been subjected to partial relaxation as illustrated by line 17.6 at the stretching tension for a period of a fraction of a second to several seconds, followed by releasing the tension and a complete or substantially complete relaxation at a tension level that is less than half the value of the stretching tension, as illustrated by the line 18.6. During relaxation to the point 24.6 at which the tension value is 1.2 daN, the tension rises to 3.5 daN along the line 54.6. At point 20.6, the film is put into place around a load at very low tension and the tension subsequently rises to 1.5 daN, for example, as illustrated by line 21.6.

The implementation of FIG. 6 makes use of prior partial relaxation under stretching tension to limit the shrinkage of the film when the tension is released, thereby providing a saving of the order of 10 to 15%. The residual stretching at 21.6 (FIG. 6) is 160% to 165%, instead of being 150% as at 21.4 (FIG. 4).

In FIG. 7, there can be seen the preferred embodiment of a machine 30 for prior stretching and relaxing film in accordance with the present invention. The machine 30 includes means 31 for receiving a reel 32 of film to be stretched, a pair of film-stretching rollers 33, 34, a roller for partially releasing the tension in the film 36, means 37 for the receiving a reel 38 for stretched and released film, deflection rollers 40, 41, 57, and 42, and at least one motor 43. Advantageously, the roller 35 drives the take-up reel 38. Motion drive or transmission means 44 include chains, cog belts, gear wheels, and/or a gear box enabling the motor 43 to drive the rollers 33, 34, and 35. By way of example, the transmission means 44 may comprise a chain or a belt 61 driven by the shaft of the motor 43 and driving the shafts of the rollers 34 and 42. A second belt or chain 63 connects the shaft of the roller 42 to the shaft of the roller 35. Means symbolized by arrow 45 press the roller 35 against the reel 38 of film that has been stretched and relaxed. The roller 35 moves away from the axis of the reel 38 in the direction of arrow 46 as the diameter of the reel 38 increases by virtue of the film being wound thereon. Advantageously, the rollers 33, 34, and/or 35 are grooved, knurled, and/or are provided with a surface that presents good adhesion relative to the film. Advantageously, there is provided between the rollers 34 and 35 a film path having a length exceeding 0.5 m, for example, equal to 0.8 m, thereby enabling the film 36 to shrink elastically in a transverse direction prior to winding, thus releasing transverse tensions in the film as generated by the longitudinal stretching tension. This facilitates winding the film on the reel 38 and subsequently unwinding it.

The operation of the machine 30 of the present invention is explained below.

Firstly, the constriction force that the film 36 is to exert on the loads that are to be wrapped is determined as is the resistance which the film must have to friction and to puncturing, with this being done as a function of the goods on the pallets and as a function of the severity of transport conditions. The drive or transmission means 44 are adjusted so as to obtain a stretching ratio and a release ratio prior to the film being wound. The stretching ratio is determined by the ratio of the peripheral speed of the roller 33 to the peripheral speed of the roller 34. The release ratio is determined by the ratio of the peripheral speed of the roller 34 to the peripheral speed of the roller 35. This ratio can be adjusted, for example, by selecting the gear wheels that are used by the motion transmission means 44. Nevertheless, implementing other means for adjusting the ratios and providing a machine that has a fixed stretching and/or release ratio would not go beyond the ambit of the present invention.

A film 36 coming from the reel 32 passes in succession over the rollers 40, 33, 41, 34, 57, 42, and 35 so as to reach the reel 38. The motor 43 is switched on to drive at least the rollers 33, 34, and 35. The film 36 is stretched between the rollers 33 and 34. Between the rollers 34 and 35, the film is released to the release tension at which it is wound on the reel 38. When the desired quantity of film has been stretched and released, the reel 38 is removed from the reel-receiving means 37 where it is replaced by a new mandrel. Where necessary, it is also possible to change the reel 32 of film to be stretched.

A variant embodiment of the machine 30 of the invention is shown in FIG. 8 which further includes two additional rollers 67 and 69 whose peripheral speed is equal to that of the roller 34, these rollers 67 and 69 being disposed between the roller 42 and the roller 35 so as to run the film 36 over a predetermined distance, for example, lying in the range of 0.5 m to 4 m, and preferably in the range of 0.6 m to 2 m. While it is on this path, the film 36 is subjected to partial relaxation under the stretching tension.

Advantageously, a polyethylene film is used having a thickness lying in the range of 10 $\mu$m to 35 $\mu$m, and preferably lying in the range of 15 $\mu$m to 23 $\mu$m.

The speed at which the film runs lies advantageously in the range of 1 m/s to 10 m/s, and preferably in the range of 3 m/s to 6 m/s.

The elongation of the film advantageously lies in the range of 50% to 500%, and preferably in the range of 200% to 300%.

The stretching tension advantageously lies in the range of 10 N/mm$^2$ to 35 N/mm$^2$, and preferably in the range of 10 N/mm$^2$ to 20 N/mm$^2$.

The width of the film lies in the range of 0.2 m to 2 m, and preferably in the range of 0.2 m to 1 m.

Depending on the initially desired type of stretched film, it is naturally possible to implement any appropriate combination of the above values.

When selecting values, it is necessary to take into account the fact that the thickness, and consequently the resistance to friction and to puncturing of a previously-stretched film decreases with elongation, and that for a given film, the elongation obtained depends on the tension exerted.

The following are some examples of films of the invention that have provided satisfactory results:

film for wrapping pallets of pressurized beer kegs (loads having high resistance to compression, and large mass): width 0.5 m, polyethylene film having a thickness of 23 $\mu$m, elongation of 300% under a tension of 20 daN wound at a tension lying in the range of 15 daN to 18 daN, with tension after relaxation being equal to 10 daN;

film for wrapping pallets containing tinned food (loads not fragile, presenting high resistance to compression, and large mass): width of polyethylene film 0.5 m, thickness 19 $\mu$m, elongation 250% under a tension of 15 daN wound at 8 daN, tension after relaxation equal to 7.5 daN;

film for wrapping a pallet of foodstuff in cardboard packaging (fairly fragile, some resistance to compression, large mass): polyethylene film of width 0.5 m, having a thickness of 19 $\mu$m, elongation of 250% under a tension of 15 daN, wound at 3 daN, tension after relaxation equal to 3.5 daN; and film for wrapping a pallet of toilet paper (not fragile, low compression resistance, low mass): polyethylene film having a width of 0.5 m, a thickness of 16 μm, elongation of 200% under tension of 10 daN wound at 1 daN, tension after relaxation equal to 1.5 daN.

The present invention relates to preparing film for wrapping around loads that are optionally on pallets, with the film being put into place manually or by machine. By way of example, it is possible to implement a manual film-laying appliance as described in patent application No. 95 05645, a helical wrapping machine having a load-carrying turntable that rotates, or a machine having a stationary load and a rotary ring.

Obviously, many modifications and variations of the present invention are possible in light of the above teachings. It is therefore to be understood that within the scope of the appended claims, the present invention may be practiced otherwise than as specifically described herein.

What is claimed is:

1. Film stretching and winding apparatus, comprising:

means for stretching a stretchable film under a predetermined amount of tension force lying within the range of 10 N/mm² to 35 N/mm²;

means for guiding said film; and means for winding said stretched film onto a storage reel such that said stretched film is relaxed upon said storage reel under a tension force lying within the range of 10% to 90% of said stretching tension force.

2. Apparatus as set forth in claim 1, wherein:

said means for winding said stretched film onto said storage reel comprises means for winding said stretched film onto said storage reel such that said stretched film is relaxed upon said storage reel under a tension force lying within the range of 10% to 50% of said stretching tension force.

3. Apparatus as set forth in claim 1, wherein:

said means for winding said stretched film onto said storage reel comprises means for partially releasing said tension within said film after said film has been stretched and prior to said winding of said film onto said storage reel.

4. Apparatus according to claim 3, wherein:

said stretching means and said means for partially releasing said tension within said film comprise motor-driven rollers wherein different peripheral speeds are defined between said rollers of said stretching means and said rollers of said means for partially releasing said tension within said film.

5. Apparatus as set forth in claim 4, wherein:

said different peripheral speeds defined between said rollers of said stretching means and said rollers of said partially releasing tension means is within the range of 10% to 90%.

6. Apparatus as set forth in claim 5, wherein:

said different peripheral speeds defined between said rollers of said stretching means and said rollers of said partially releasing tension means is within the range of 10% to 50%.

7. Apparatus as set forth in claim 4, wherein:

said rollers of said stretching means comprise a first roller and a second roller; and said rollers of said partially releasing tension means comprise said second roller and a third roller.

8. Apparatus as set forth in claim 7, further comprising:

motor drive means for driving said rollers of said stretching means and said rollers of said partially releasing tension means; and belt drive means interconnecting said motor drive means and said rollers of said stretching means and said rollers of said partially releasing tension means.

9. Apparatus as set forth in claim 7, further comprising:

motor drive means for driving said rollers of said stretching means and said rollers of said partially releasing tension means; and chain drive means interconnecting said motor drive means and said rollers of said stretching means and said rollers of said partially releasing tension means.

10. Apparatus according to claim 4, further comprising:

means for varying the ratio of said peripheral speeds of said rollers of said stretching means and the ratio of said peripheral speeds of said rollers of said means for partially releasing said tension within said film.

11. Apparatus as set forth in claim 4, wherein:

said rollers are externally grooved so as to provide a predetermined amount of friction drive with respect to said film.

12. Apparatus as set forth in claim 4, wherein:

said rollers are externally knurled so as to provide a predetermined amount of friction drive with respect to said film.

13. Apparatus as set forth in claim 1, wherein:

said film comprises polyethylene.

14. Apparatus as set forth in claim 13, wherein:

said polyethylene film comprises linear low density polyethylene (LLDPE).

15. Apparatus as set forth in claim 13, wherein:

said polyethylene film has a thickness lying within the range of 10 μm to 35 μm.

16. Apparatus as set forth in claim 1, wherein:

said reel comprises a plastic material.

17. Apparatus as set forth in claim 1, wherein:

said reel comprises cardboard.

18. Apparatus as set forth in claim 1, wherein:

said reel is fabricated from steel.

* * * * *